(12) United States Patent
Swoboda

(10) Patent No.: US 7,886,194 B2
(45) Date of Patent: Feb. 8, 2011

(54) EVENT-GENERATING INSTRUCTIONS

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 987 days.

(21) Appl. No.: 11/383,433

(22) Filed: May 15, 2006

(65) Prior Publication Data

US 2006/0282710 A1    Dec. 14, 2006

Related U.S. Application Data

(60) Provisional application No. 60/681,427, filed on May 16, 2005, provisional application No. 60/681,494, filed on May 16, 2005.

(51) Int. Cl.
*G06F 11/00* (2006.01)
(52) U.S. Cl. ...................... 714/38
(58) Field of Classification Search .............. 714/38; 703/22

See application file for complete search history.

(56) References Cited

U.S. PATENT DOCUMENTS

| | | | |
|---|---|---|---|
| 4,051,354 A * | 9/1977 | Choate | 714/711 |
| 5,552,750 A * | 9/1996 | Barrett et al. | 331/25 |
| 5,737,516 A * | 4/1998 | Circello et al. | 714/38 |
| 5,768,500 A * | 6/1998 | Agrawal et al. | 714/47 |
| 5,828,824 A * | 10/1998 | Swoboda | 714/25 |
| 6,112,318 A * | 8/2000 | Jouppi et al. | 714/47 |
| 6,134,676 A * | 10/2000 | VanHuben et al. | 714/39 |
| 6,253,338 B1 * | 6/2001 | Smolders | 714/45 |
| 6,341,357 B1 * | 1/2002 | Ravichandran | 714/38 |
| 6,397,379 B1 * | 5/2002 | Yates et al. | 717/140 |
| 6,553,513 B1 * | 4/2003 | Swoboda et al. | 714/28 |
| 6,754,852 B2 * | 6/2004 | Swoboda | 714/39 |
| 6,959,404 B2 * | 10/2005 | Hirakawa et al. | 714/55 |
| 6,978,462 B1 * | 12/2005 | Adler et al. | 719/318 |
| 7,013,456 B1 * | 3/2006 | Van Dyke et al. | 717/130 |
| 7,107,489 B2 * | 9/2006 | Gergen et al. | 714/30 |
| 7,395,527 B2 * | 7/2008 | DeWitt et al. | 717/127 |
| 2001/0039488 A1 * | 11/2001 | Swoboda | 703/17 |
| 2002/0111785 A1 * | 8/2002 | Swoboda et al. | 703/28 |
| 2002/0129309 A1 * | 9/2002 | Floyd et al. | 714/724 |

OTHER PUBLICATIONS

"Intel® XScale™ Microarchitecture", Technical Summary, Copyright© Intel Corporation 2000, 13 pp.

* cited by examiner

*Primary Examiner*—Robert Beausoliel
*Assistant Examiner*—Elmira Mehrmanesh
(74) *Attorney, Agent, or Firm*—Robert D. Marshall, Jr.; W. James Brady; Frederick J. Telecky, Jr.

(57) ABSTRACT

An information carrier medium containing debugging software that, when executed by a processor, causes the processor to generate an event signal and an event code and provide the event signal and the event code to an event detection logic coupled to the processor. The event detection logic is adapted to generate a plurality of events, where a number of events generated corresponds to the event code.

19 Claims, 2 Drawing Sheets

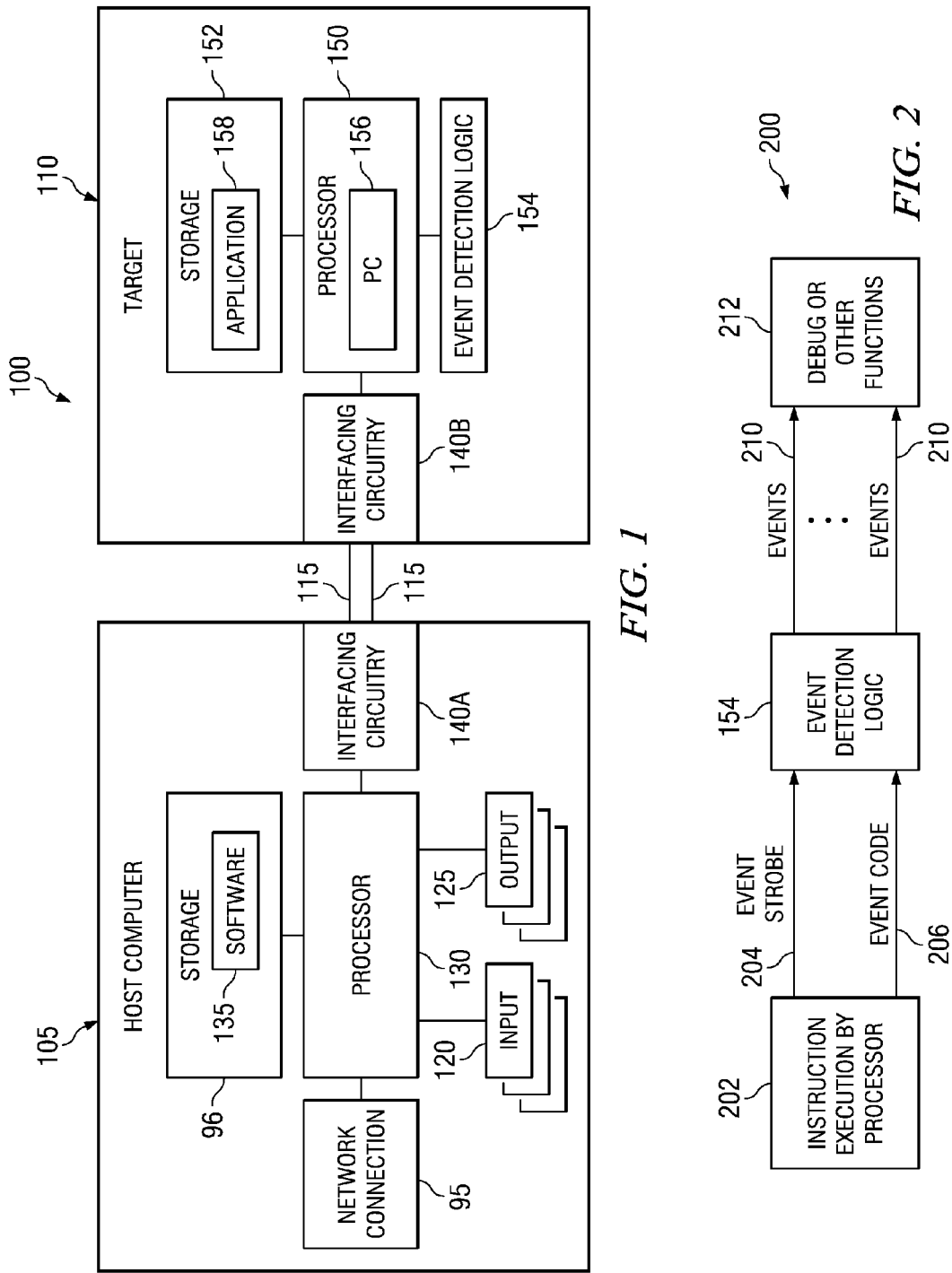

EVENT-GENERATING INSTRUCTIONS

CROSS-REFERENCE TO RELATED APPLICATIONS

This application claims the benefit of U.S. Provisional Application Ser. No. 60/681,427 filed May 16, 2005, titled "Debugging Software-Controlled Cache Coherence," and U.S. Provisional Application Ser. No. 60/681,494 filed May 16, 2005, titled "Debug Event Instructions Accesses Application In Secure Mode," both of which are incorporated by reference herein as if reproduced in full below.

This application also may contain subject matter that may relate to the following commonly assigned co-pending applications incorporated herein by reference: "Real-Time Monitoring, Alignment, and Translation of CPU Stalls or Events," Ser. No. 11/383,361, filed May 15, 2006; "Event and Stall Selection," Ser. No. 11/383,389, filed May 15, 2006; "Watermark Counter With Reload Register," filed May 15, 2006; "Real-Time Prioritization of Stall or Event Information," Ser. No. 11/383,465, filed May 15, 2006; "Method of Translating System Events Into Signals For Activity Monitoring," Ser. No. 11/383,466, filed May 15, 2006; "System and Methods for Stall Monitoring," Ser. No. 11/383,472, filed May 15, 2006; "Monitoring of Memory and External Events," Ser. No. 11/383,473, filed May 15, 2006; and "Selectively Embedding Event-Generating Instructions," Ser. No. 11/383,438, filed May 15, 2006.

BACKGROUND

Various testing and debugging software may be used to test or debug hardware systems and applications stored on such systems. During the debugging process, the hardware systems and applications on the systems may generate one or more events indicative of a status of the hardware or applications being tested/debugged. Controlling the generation of at least some of these events would enhance debugging capabilities.

SUMMARY

The problems noted above are solved in large part by using event generating instructions. An illustrative embodiment includes information carrier medium containing debugging software that, when executed by a processor, causes the processor to generate an event signal and an event code and provide the event signal and the event code to an event detection logic coupled to the processor. The event detection logic is adapted to generate a plurality of events, where a number of events generated corresponds to the event code.

Another illustrative embodiment includes a system comprising a storage coupled to the processor and comprising software that includes an event-generating instruction (EGI). The system also comprises a processor coupled to the storage and adapted to generate an event signal and an event code by executing the EGI. The system further comprises an event detection logic coupled to the processor, the logic adapted to detect the event signal and event code and to generate a plurality of events associated with the event signal and event code. A number of the plurality of events corresponds to the event code.

Yet another illustrative embodiment includes a method comprising a processor generating an event signal and an event code, providing the event signal and the event code to an event detection logic, and the event detection logic generating a plurality of events in response to the event signal. A number of events generated corresponds to the event code.

BRIEF DESCRIPTION OF THE DRAWINGS

For a detailed description of exemplary embodiments of the invention, reference will now be made to the accompanying drawings in which:

FIG. 1 shows an illustrative debugging system, in accordance with embodiments of the invention;

FIG. 2 shows a conceptual diagram associated with event-generating instructions, in accordance with embodiments of the invention;

NOTATION AND NOMENCLATURE

Figure 3:
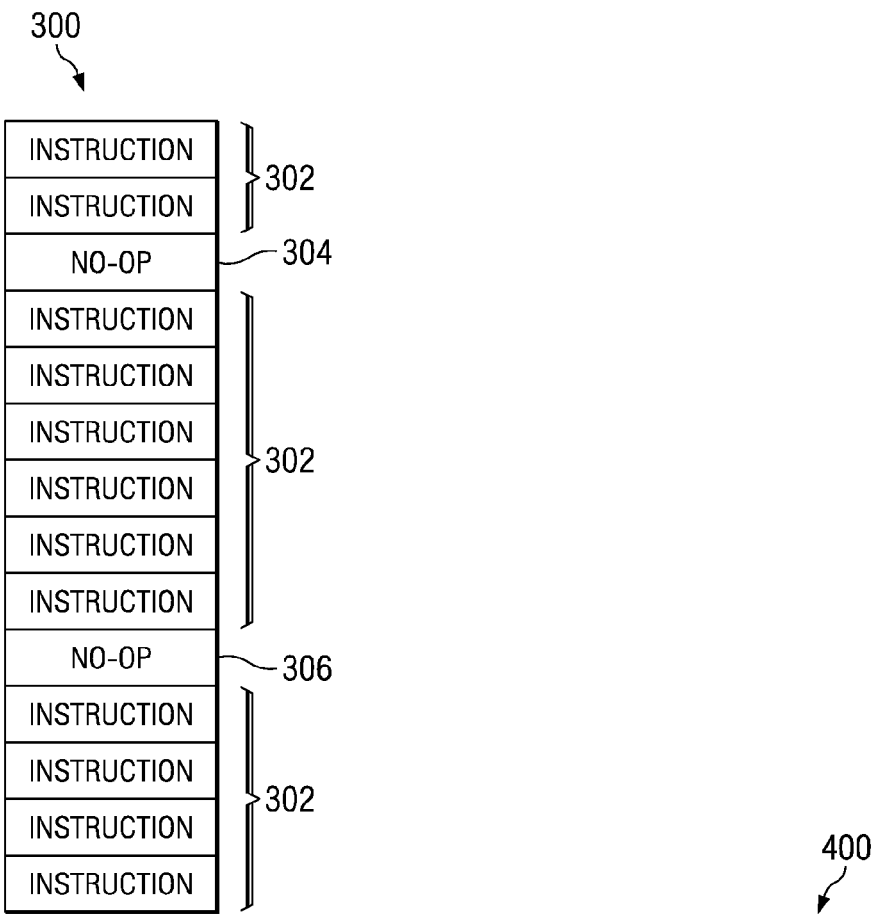
FIG. 3 shows a plurality of instructions in an application being debugged in accordance with embodiments of the invention.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical or optical connection, or through an indirect electrical or optical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 depicts an exemplary debugging system 100 including a host computer 105 coupled to a target device 110 through a connection 115. A user may debug the target device 110 by operating the host computer 105. To this end, the host computer 105 may include one or more input devices 120, such as keyboards, mice, etc., as well as one or more output devices 125, such as monitors and printers. Both the input device(s) 120 and the output device(s) 125 couple to a processor 130 that is capable of receiving commands from a user and executing testing/debugging software 135 accordingly. The testing/debugging software 135, which is stored in storage 96, may be provided to the host computer 105 in the form of code delivered using one or more information carrier media. For example, the code may be stored on a compact disc, a flash drive, a floppy disk, etc., or may be provided by way of an Internet download (e.g., from a Website or file transfer protocol (FTP) server). The processor 130 may communicate with other computer systems by way of the network connection 95 (e.g., Internet or intranet connection).

Connection 115 may be a wireless, hard-wired, or optical connection. In the case of a hard-wired connection, connection 115 preferably is implemented in accordance with any suitable protocol such as a JTAG (which stands for Joint Testing Action Group) type of connection. Additionally, hard-wired connections may include real time data exchange (RTDX) types of connection developed by TEXAS INSTRUMENTS®, INC. or real-time trace. The RTDX provides system developers continuous real-time visibility into the applications that are being developed on the target 110 instead of having to force the application to stop via a breakpoint in order to see the details of the application execution. Both the host 105 and the target 110 may include interfacing circuitry 140A-B to facilitate implementation of JTAG, RTDX, or other interfacing standards.

The target 110 preferably includes a processor 150 executing an application 158 stored in storage 152. The processor 150 couples to an event detection logic 154 which detects and/or decodes events generated by the processor 150 (e.g., by a processor core or cache controllers in the processor 150) or by other circuit logic coupled to the processor 150. The processor 150 comprises a program counter (PC) 156. The PC 156 preferably indicates the location, within memory, of the next instruction to be fetched for execution by the processor 150. The software 135 on the host 105 is used to actively debug the application 158 on the target 110.

The application 158 comprises a plurality of instructions. Although the application 158 is shown as being stored entirely on the storage 152, the scope of disclosure is not limited as such. Instead, the plurality of instructions associated with the application 158 may be stored in one or more storages (none of which are specifically shown except for the storage 152) on the target 110. Each instruction comprises an opcode and at least some instructions may comprise one or more operands.

Instructions associated with the application 158 are transferred to the processor 150 for execution. In accordance with preferred embodiments of the invention, at least some of the instructions are instructions which, when executed, cause the processor 150 or other parts of the target 110 to generate one or more "events." In some embodiments, an event may broadly be defined as a signal indicating that something has occurred within the target 110. The "something" that precipitates the event may vary. For example, a cache controller in the processor 150 may generate an event when a cache hit occurs or when a cache miss occurs. The generation of an event also may be precipitated by various factors such as cache incoherence issues, processor conflicts, mouse clicks, keyboard input, etc. In other embodiments, an event may be defined as a signal which triggers a function or an operation. The function/operation may be a software operation, a hardware operation, or some combination thereof. For instance, an event may trigger software trace activity, whereby a software developer may trace through software code to debug the code.

Instructions that generate events are termed "event-generating instructions" (EGIs). EGIs preferably comprise an opcode and an event field, and optionally comprise one or more operands. The event field comprises bits which determine the type of event(s) that execution of the EGI would generate. The event field may comprise an event code, which determines the number of events that are generated. The event code is described further below.

FIG. 2 shows a conceptual diagram 200 of the execution of an EGI. As represented by numeral 202, an EGI (e.g., associated with the application 158) is executed by the processor 150 or another suitable circuit logic. Execution of the EGI causes the processor 150 or other suitable circuit logic to generate an event strobe signal, represented by numeral 204. The event strobe 204 is transferred to the event detection logic 154, which comprises circuit logic that detects and decodes various event signals generated within the target 110. The logic 154 detects and decodes the event strobe 204 to produce an event, represented by numeral 210. The event 210 is then transferred to the debugging software 135 via the connection 115 or to some other suitable destination (generically represented by numeral 212). As previously mentioned, in some embodiments, an EGI may comprise an event code. In such embodiments, the processor 150 or other suitable circuit logic may output an event code 206 with the event strobe 204. Upon detecting and decoding the event strobe 204 and the event code 206, the logic 154 generates a plurality of events 210.

The event code 206 comprises one or more bits. The number of bits in the event code determines the number of events 210 that may be generated. For example, in some embodiments, providing the logic 154 with an event strobe 204 and event code 206 causes the logic 154 to generate n events, where n is the number of bits in the event code. Likewise, in other embodiments, providing the logic 154 with an event strobe 204 and event code 206 causes the logic 154 to generate $2^n$ events, where n is the number of bits in the event code. Preferably, execution of an event-generating instruction has minimal impact on the application 158 other than event generation. The generated event(s) preferably do not alter instruction flow.

EGIs may be used for various tasks. Such instructions may be used to generate events that initiate or terminate trace activity, benchmark counters, external triggers, cross triggers, task numbers, etc. Generally, an EGI may be designed (e.g., by way of the event field) to initiate any suitable, desired action. In addition to the logic 154, generated events also may be transferred to decode logic coupled to the processor 150, to a pin (not specifically shown) that performs debug functions, and/or to a pin (not specifically shown) that performs an application function. Further, in some embodiments, the processor 150 or some other suitable circuit logic may align a generated event with the PC of the instruction which generated that event using the PC 156. The aligned event and PC associated with that event then may be provided to triggering or trace logic (not specifically shown).

EGIs may be embedded into the application 158 using various techniques, one of which is now described. In accordance with embodiments of the invention, the application 158 may comprise software instructions as shown in FIG. 3. Specifically, FIG. 3 shows a set of instructions 300 associated with the application 158. The instruction set 300 comprises general instructions 302 which may be used to perform various functions. The instruction set 300 also comprises NO-OPs (no-operation instructions) 304 and 306. When executed by the processor 150, a NO-OP causes the processor to consume a predetermined number of clock cycles without performing operations. The NO-OPs 304 and 306 are selectively embedded by a software developer at locations in the application 158 that would facilitate strategic debugging operations by the debugging software 135. For instance, the NO-OP 304 may be placed at the beginning of a subroutine and the NO-OP 306 may be placed at the end of a subroutine. The scope of disclosure is not limited to embedding the NO-OPs at any specific location within the application 158. A NO-OP is embedded in the application 158 by inserting an op-code at a desired location, where the op-code corresponds to the NO-OP instruction.

While the application 158 is actively debugged by the debugging software 135, the processor 150 provides to the processor 130 information associated with the NO-OPs 304 and 306. In at least some embodiments, the information provided to the processor 130 includes the addresses in the storage 96 which correspond to the NO-OPs 304 and 306. In turn, the processor 130 provides these addresses to a user of the software 135 (e.g., via a display). In accordance with embodiments of the invention, the user may use the software 135 to replace one or more of the NO-OPs with EGIs stored on the host 105. For instance, the user of the software 135 may determine that the NO-OP 304 is located at address 0x00000020h, and the NO-OP 306 is located at 0x00000034h. The user also may determine that the NO-OP 304 is located at the beginning of a subroutine that the user wishes to trace, and the NO-OP 306 is located at the end of this subroutine. In such a case, the user may replace the NO-OP 304 with a first EGI, and may replace the NO-OP 306 with a second EGI. When executed, the first EGI may cause the logic 154 to generate an event that initiates trace activity, and the second EGI may cause the logic 154 to generate an event that stops the trace activity.

When replacing the NO-OPs 304 and 306 with the EGIs, the processor 130 may transfer the EGIs to the processor 150. The processor 150 may perform a memory-write of the first EGI to address 0x00000020h and the second EGI to address 0x00000034h. Preferably, the number of clock cycles used to execute an EGI is the same as the number of clock cycles stalled by the NO-OP it replaces, thereby seamlessly integrating the EGI into the program flow. Thus, by selectively replacing NO-OPs with EGIs, the user is able to adjust the code of the application 158 "on-the-fly" to generate events that suit his or her debugging objectives.

Figure 4:
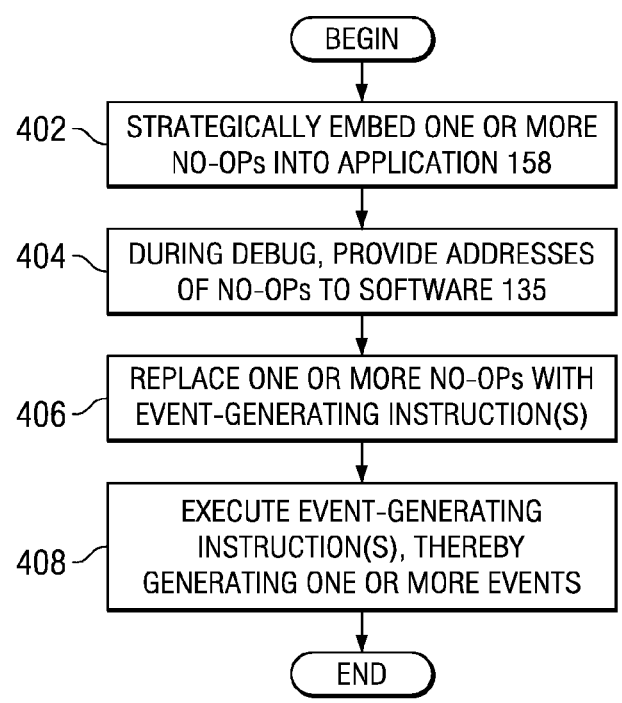
FIG. 4 shows a flow diagram of a method implemented in accordance with embodiments of the invention.

FIG. 4 shows a flow diagram of a method 400 implemented in accordance with embodiments of the invention. The method 400 begins with strategically embedding one or more NO-OPs into the application 158 (block 402). The method 400 continues with providing addresses of NO-OPs to the software 135 during debug (block 404). Based on the NO-OP addresses, the user of the software 135 replaces one or more NO-OPs with event-generating instruction(s) as desired (block 406). The method 400 further comprises executing the event-generating instruction(s), thereby generating one or more events (block 408).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable storage medium containing debugging software that, when executed by a processor, causes the processor to:
   generate an event signal and an event code, the event code comprising a total quantity of bits; and
   provide the event signal and the event code to an event detection logic coupled to the processor, said event detection logic adapted to generate a plurality of events;
   wherein a number of events generated corresponds to said event code;
   wherein said number is approximately $2^n$, and wherein n is the total quantity of bits in the event code.

2. The computer-readable storage medium of claim 1, wherein the number of events generated corresponds to a quantity of bits associated with said event code.

3. The computer-readable storage medium of claim 1, wherein said number is the same as a quantity of bits in the event code.

4. The computer-readable storage medium of claim 1, wherein the software causes the processor to align at least one of the plurality of events with a program counter of an instruction corresponding to said at least one of the plurality of events.

5. The computer-readable storage medium of claim 1, wherein the event detection logic transfers at least some of the plurality of events to debug logic coupled to the processor.

6. The computer-readable storage medium of claim 1, wherein the event signal comprises a strobe signal.

7. The computer-readable storage medium of claim 1, wherein at least one of the plurality of events is adapted to trigger trace activity.

8. The computer-readable storage medium of claim 1, wherein at least one of the plurality of events is adapted to cause a function to start or stop operation.

9. A system, comprising:
   a storage coupled to the processor and comprising software that includes an event-generating instruction (EGI);
   a processor coupled to the storage and adapted to generate an event signal and an event code by executing the EGI, the event code comprising a total quantity of bits; and
   an event detection logic coupled to the processor, said logic adapted to detect the event signal and event code and to generate a plurality of events associated with the event signal and event code;
   wherein a number of said plurality of events corresponds to said event code;
   wherein said number is approximately $2^n$, and wherein n is the total quantity of bits in the event code.

10. The system of claim 9, wherein the number of said plurality of events corresponds to a quantity of bits in said event code.

11. The system of claim 9, wherein said number is less than or equal to a quantity of bits associated with the event code.

12. The system of claim 9, wherein the event signal comprises a strobe signal.

13. The system of claim 9, wherein at least one of the plurality of events is adapted to trigger trace activity.

14. The system of claim 9, wherein at least one of the plurality of events is adapted to trigger the start or stop of a functional unit.

15. A method, comprising:
   a processor generating an event signal and an event code, the event code comprising a total quantity of bits;
   providing the event signal and the event code to an event detection logic; and
   the event detection logic generating a plurality of events in response to the event signal;
   wherein a number of events generated corresponds to said event code;
   wherein said number is approximately $2^n$, and wherein n is the total quantity of bits in said event code.

16. The method of claim 15, wherein said number of events generated corresponds to a quantity of bits associated with said event code.

17. The method of claim 15, wherein said number of events generated is substantially the same as a quantity of bits in the event code.

18. The method of claim 15 further comprising forwarding at least one of said plurality of events to a debug logic coupled to said processor.

19. The method of claim 15, wherein at least one of the plurality of events is capable of triggering trace activity.

* * * * *